United States Patent
Macdonald et al.

(10) Patent No.: US 9,165,102 B1
(45) Date of Patent: Oct. 20, 2015

(54) ROUTING STANDARD CELL-BASED INTEGRATED CIRCUITS

(71) Applicants: Colin Macdonald, Austin, TX (US);
Anis M. Jarrar, Austin, TX (US);
Kristen L. Mason, Austin, TX (US)

(72) Inventors: Colin Macdonald, Austin, TX (US);
Anis M. Jarrar, Austin, TX (US);
Kristen L. Mason, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 31 days.

(21) Appl. No.: 14/246,544

(22) Filed: Apr. 7, 2014

(51) Int. Cl.
*G06F 17/50* (2006.01)

(52) U.S. Cl.
CPC ........ *G06F 17/5077* (2013.01); *G06F 17/5081* (2013.01); *G06F 2217/06* (2013.01); *G06F 2217/78* (2013.01)

(58) Field of Classification Search
CPC ............. H01L 2224/73265; G06F 17/5077; G06F 17/5081; G06F 17/5031; G06F 17/5045; G06F 2217/78; G06F 17/5068; G06F 2217/84
USPC .................. 716/126, 129–130, 132–135, 139
See application file for complete search history.

(56) References Cited

U.S. PATENT DOCUMENTS

| | | | |
|---|---|---|---|
| 6,240,542 B1 | 5/2001 | Kapur | |
| 2008/0127000 A1 | 5/2008 | Majumder et al. | |
| 2010/0199252 A1* | 8/2010 | Torvi | G06F 17/5068 716/52 |
| 2011/0049575 A1* | 3/2011 | Tanaka | H01L 27/11807 257/206 |
| 2011/0276937 A1 | 11/2011 | Waller | |
| 2012/0241986 A1 | 9/2012 | Sherlekar et al. | |

* cited by examiner

*Primary Examiner* — Nghia Doan
(74) *Attorney, Agent, or Firm* — Van Leeuwen & Van Leeuwen; Jonathan N. Geld (57) ABSTRACT

This disclosure describes a multi-height routing cell and utilization of the multi-height routing in an integrated circuit to reduce routing congestion in a standard cell design floorplan. The multi-height routing cell includes a bypass connection, or "tunnel," that routes a signal through a non-routing layer and under an impeding power rail. The multi-height routing cell includes bypass connectors on both sides of the bypass connection that provide connection points for which to connect standard cells on opposite sides of the impeding power rail. As such, the multi-height routing cell provides a route underneath the impeding power rail and, in turn, reducing routing congestion in the standard cell design floorplan.

18 Claims, 7 Drawing Sheets

ROUTING STANDARD CELL-BASED INTEGRATED CIRCUITS

TECHNICAL FIELD

The present disclosure relates to creating multi-height routing cells and using the multi-height routing cells to resolve routing congestion in a standard cell design floorplan.

BACKGROUND

Standard cell integrated circuit design involves several steps such as system-level design, design description conversion/verification, logic synthesis, and physical design. System-level design involves creating a behavioral, or functional specification, which may utilize a variety of languages and tools such as C/C++ models, Transaction Level Models (TLM), etc. The design description conversion/verification process, commonly known as register transfer level (RTL) design and verification, converts the functional specification into a description that describes the behavior of the electronic circuit at a register level on a per clock cycle basis. This process involves verifying a compiled version of the design description to ensure proper design behavior.

The logic synthesis stage involves using a standard cell library to transform the RTL design into a technology-dependent gate level netlist that includes standard cell instances and port connection information. The physical design process uses the gate level netlist to place standard cell instances on a design floorplan and route the design by placing wire segment objects to connect the standard cell instances according to connection data such as the port connection information. The design floor plan is typically based upon a semiconductor process technology corresponding to the standard cell library used to create the design.

Today's semiconductor process technologies use metal layers in a semiconductor wafer to connect the standard cell instances according to the routing results from the physical design stage. A semiconductor wafer's "first" metal layer, referred to as a "metal 1 layer," also includes power rails that run in parallel to power the standard cell circuitry. As such, the place and route design tool typically routes connections around these power rails that, in turn, creates routing congestion areas, or "hot spots," on the metal 1 layer from a high concentration of routing connections.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

This disclosure describes a multi-height routing cell and utilization of the multi-height routing in an integrated circuit to reduce routing congestion in a standard cell design floorplan. The multi-height routing cell includes a bypass connection, or "tunnel," that routes a signal through a non-routing layer and under an impeding power rail. The multi-height routing cell includes bypass connectors on both sides of the bypass connection that provide connection points for which to connect standard cells on opposite sides of the impeding power rail. As such, the multi-height routing cell provides a route underneath the impeding power rail and, in turn, reducing routing congestion in the standard cell design floorplan.

Figure 1:
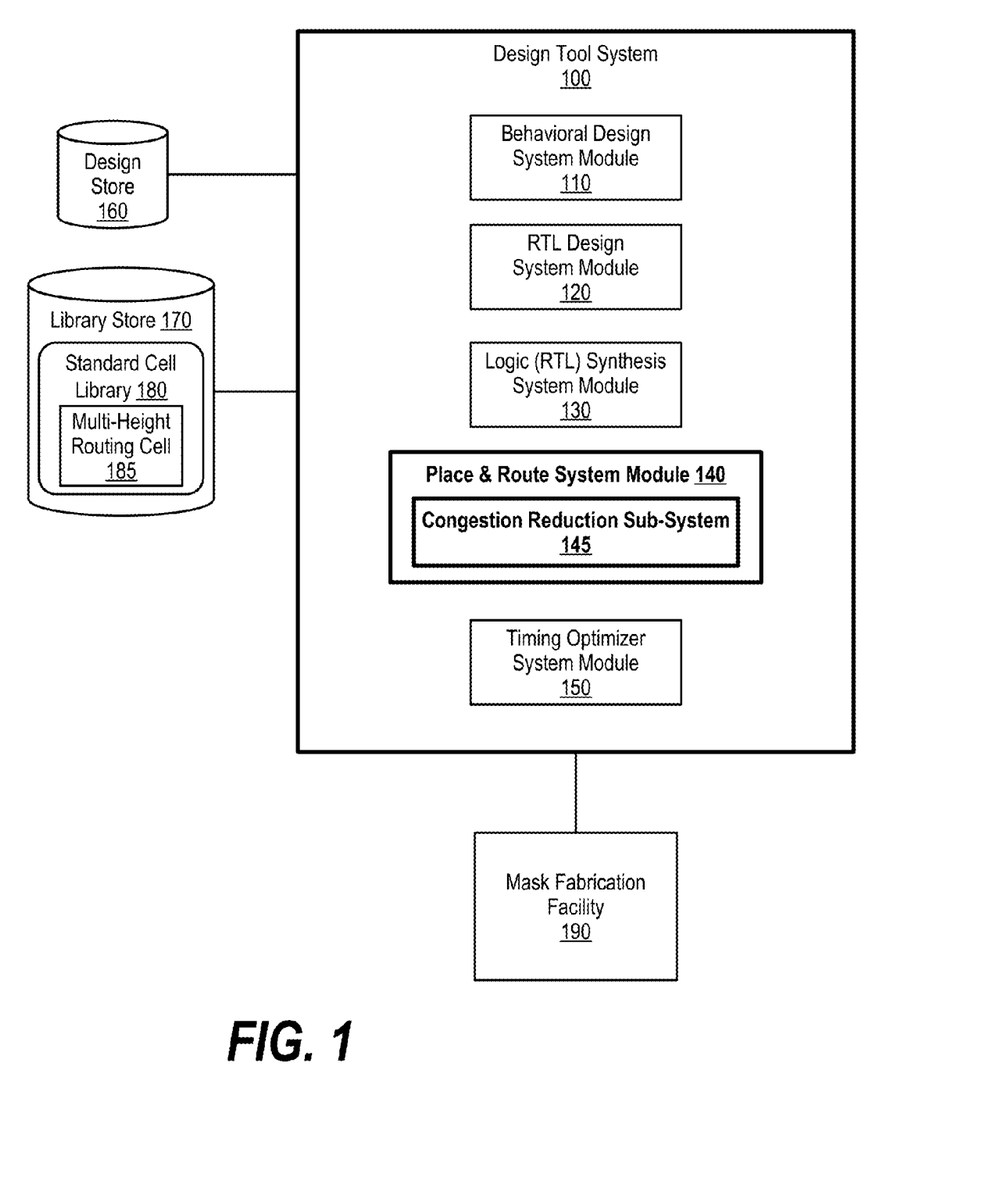
FIG. 1 is a diagram depicting one example of a design tool system that utilizes multi-height routing cells to reduce routing congestion during a place and route stage of a standard cell design.

FIG. 1 is a diagram depicting one example of a design tool system that utilizes multi-height routing cells to reduce routing congestion during a place and route stage of a standard cell design. In one embodiment, design tool system 100 includes processor(s) and/or design tool circuitry. Design tool system 100 includes system modules 110, 120, and 130 that execute steps in a standard cell design flow, such as an EDA (Electronic Design Automation) design flow. EDA utilizes a set of synthesis, verification, and test tools that check an integrated circuit system design, translate the corrected system design to a register-transfer level (RTL) description, and then proceed through synthesis and verification stages at the gate level to produce a physical design described in graphics data system II (GDS II) format, which a mask fabrication facility uses to generate masks configured to create the integrated circuit on a semiconductor wafer.

Behavioral design system module 110 generates behavioral design data based on an integrated circuit design specification located in design store 160. The behavioral design data includes, for example, behavioral algorithms or code that describes system behavior of the integrated circuit. RTL (register transfer level) design system module 120 transforms the behavioral design data into an RTL description that describes data flow at a register level on a per clock cycle basis. Logic synthesis system module 130 transforms the RTL description into a technology-dependent netlist based upon standard cell library 180 located in library store 170. The netlist includes functional standard cell instances (e.g., flip-flops, NAND gates, inverters, etc.) and port connection information that describes electrical connections between the standard cell instances.

Place and route system module 140 uses the netlist to place the standard cell instances on a design floorplan and perform a "first pass" routing to place wire segment objects on the design floor plan based upon the port connection information that connect the standard cell instances. A design floorplan of an integrated circuit is a schematic representation of tentative placement of its major functional blocks (e.g., flip-flops, NAND gates, etc.). As discussed herein, wire segment objects are objects placed on a design floor plan, and wire segments are the metal placed on a semiconductor wafer corresponding to the wire segment objects.

The design floorplan includes object placement information for multiple masks to generate multiple "layers" on a semiconductor wafer. Semiconductor wafers typically include several metal layers for routing wire segments. The first metal layer, "metal 1 layer", also includes power rails that typically run parallel to each other and provide power to standard cell circuitry (see power rails 210, 215, 220 in FIG. 2). Although these power rails are essential, they can also be obstructions during the routing process to connect standard cell instances.

Subsequent to the first pass routing discussed above, if place and route system module 140 detects a routing congestion area, place and route system module 140 employs congestion reduction sub-system 145 to resolve the routing congestion area. Place and route system module 140 may specify routing congestion areas as those areas that include design rule check (DRC) violations exceeding a pre-defined threshold. Place and route system module 140 may also specify a routing congestion area as an area that is densely routed where some routes are "pushed" out and made longer (circuitous routes) such that timing is adversely affected.

Figure 2:
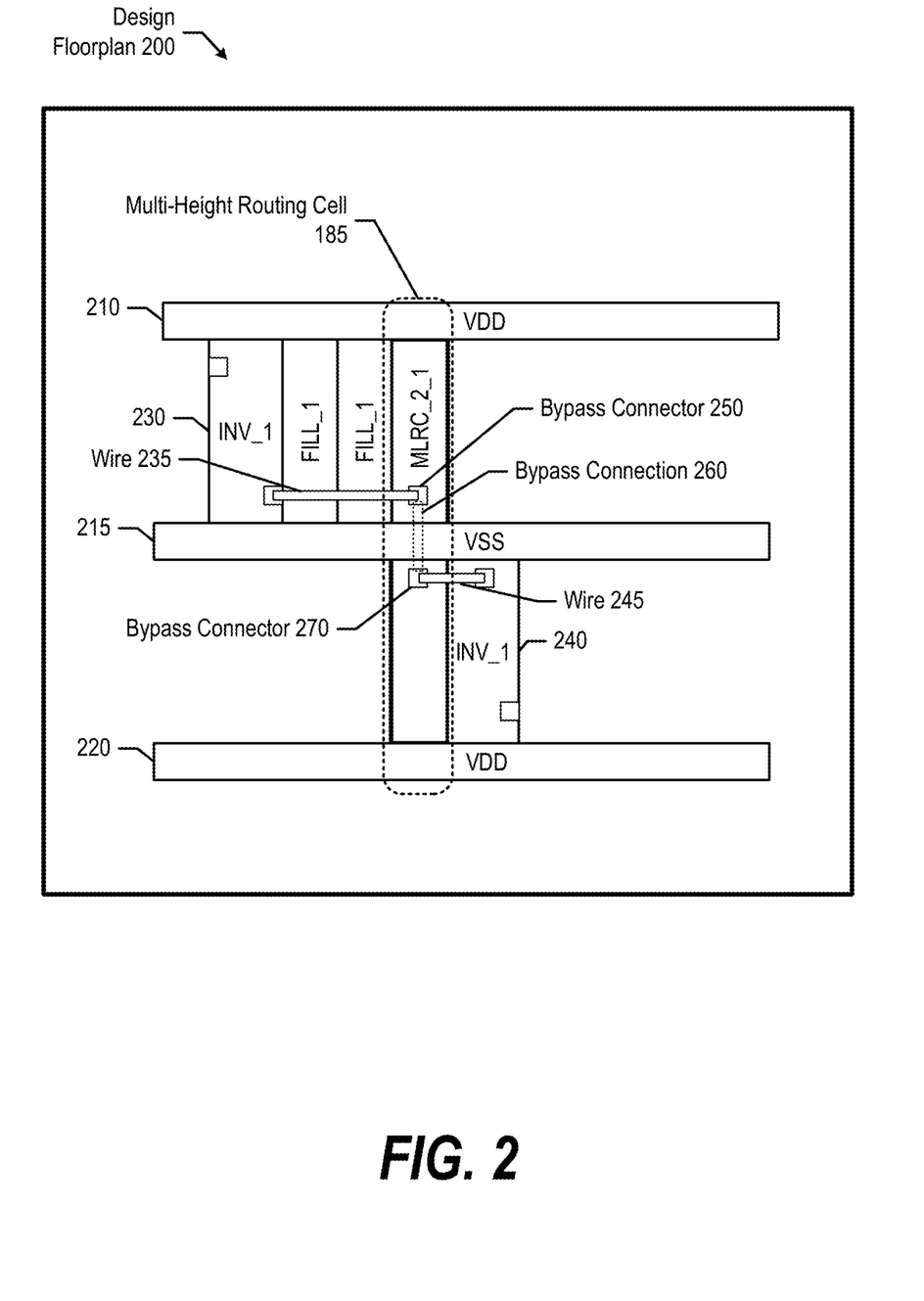
FIG. 2 is a diagram depicting one example of a design floorplan using a multi-height routing cell to provide an electrical connection underneath an obstructing power rail.
Figure 3:
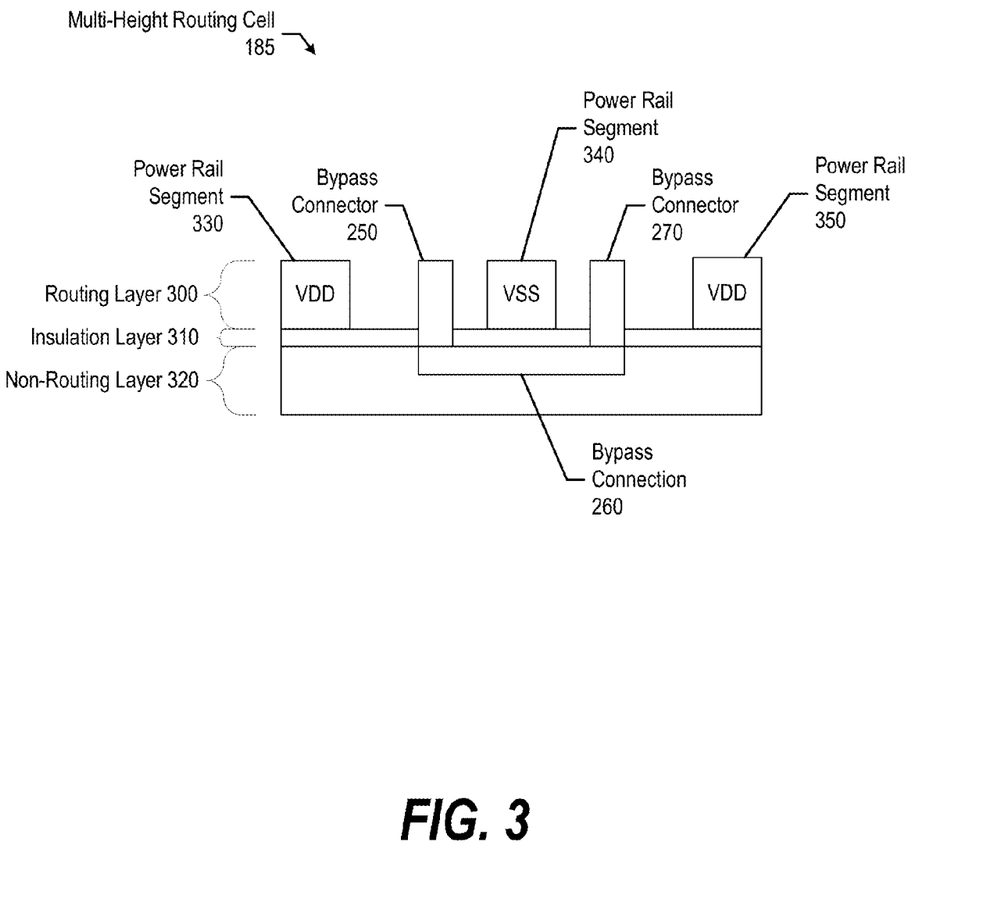
FIG. 3 is a diagram depicting one example of a cross-section of a multi-height routing cell.

Congestion reduction sub-system 145 performs steps to insert multi-height routing cell 185 included in standard cell library 180 in routing congestion areas to provide a routing "tunnel" underneath an obstructing power rail through a non-routing layer. FIG. 3 shows a cross-section view of multi-height routing cell 185. As can be seen, multi-height routing cell 185 includes bypass connection 260, which routes underneath power rail 215 through non-routing layer 320. Multi-height routing cell 185 also includes bypass connectors 250 and 270 on routing layer 300 (metal 1 layer) that electrically connect bypass connection 260 to metal wire objects on opposite sides of power rail 215. For example, FIG. 2 illustrates a top-down view of multi-height routing cell 185 showing bypass connector 250 electrically coupled to inverter 230 through wire 235, and bypass connector 270 electrically coupled to inverter 240 through wire 245. As such, inverter 230 is electrically coupled to inverter 240 via bypass connection 260 included in multi-height routing cell 185 (discussed in more detail below).

Referring back to FIG. 1, once congestion reduction sub-system 145 inserts multi-height routing cells 185, place and route system module 140 performs a "second pass" routing using the inserted multi-height routing cells 185 (see FIG. 4 and corresponding text for further details) to create routing on the design floorplan that is absent of routing congestion areas. In turn, place and route system module 140 generates a physical netlist that includes timing delay information (e.g., parasitics) such as wire loading (capacitances, resistances), fan outs, etc., which timing optimizer system module 150 utilizes to perform timing optimization.

Once timing optimizer system module 150 resolves any timing issues, which may include recursive passes through various system modules discussed above, design tool system 100 creates mask layer data that includes information necessary to create wafer masks. Mask fabrication facility 190 receives the mask layer data and creates masks from the mask layer data, that, in turn, a semiconductor facility uses to create an integrated circuit on a semiconductor wafer.

FIG. 2 is a diagram depicting one example of a design floorplan that uses a multi-height routing cell to provide a connection underneath an obstructing power rail. Design floor plan 200 includes various power rails (210, 215, and 220). Metal 1 routing layers on an integrated circuit typically include numerous power rails that traverse parallel to each another. However, routing around the power rails to connect functional standard cells (inverters, flip-flops, NAND gates, NOR gates, etc.) together creates congested areas, or hot spots. In order to avoid increasing routing congestion to other metal layers (e.g., metal layer 2, 3, etc.), congestion reduction sub-system 140 places multi-height routing cell 185 on design floorplan 200 to route "underneath" power rail 215.

Multi-height routing cell 185 includes bypass connector 250, bypass connection 260, and bypass connector 270. Wire segment objet 235 couples inverter 230 to bypass connector 250. Bypass connector 250 is coupled to bypass connection 260 and bypass connector 270 (see FIG. 3 and corresponding text for further details). And, bypass connector 270 is coupled to inverter 240 through wire segment object 245. As a result, inverter 230 is coupled to inverter 240 through multi-height routing cell 185. In turn, the requirement to route around power rail 215 is avoided. In one embodiment, standard cell library 180 includes multiple versions of multi-height routing cells, each of which having different placements of bypass connectors 250 and 270 (see FIG. 5 and corresponding text for further details). In this embodiment, congestion reduction sub-system 145 selects a version of multi-height routing cell 185 that best fits design floorplan 200 (see FIGS. 4, 5, and corresponding text for further details).

FIG. 3 is a diagram depicting one example of a cross-section of a multi-height routing cell. Multi-height routing cell 185 includes objects on routing layer 300 (metal 1 layer) and non-routing layer 320 (e.g., polysilicon layer). A semiconductor fabrication process places insulation layer 310 on a wafer to insulate routing layer 300 from non-routing layer 320.

Figure 5:
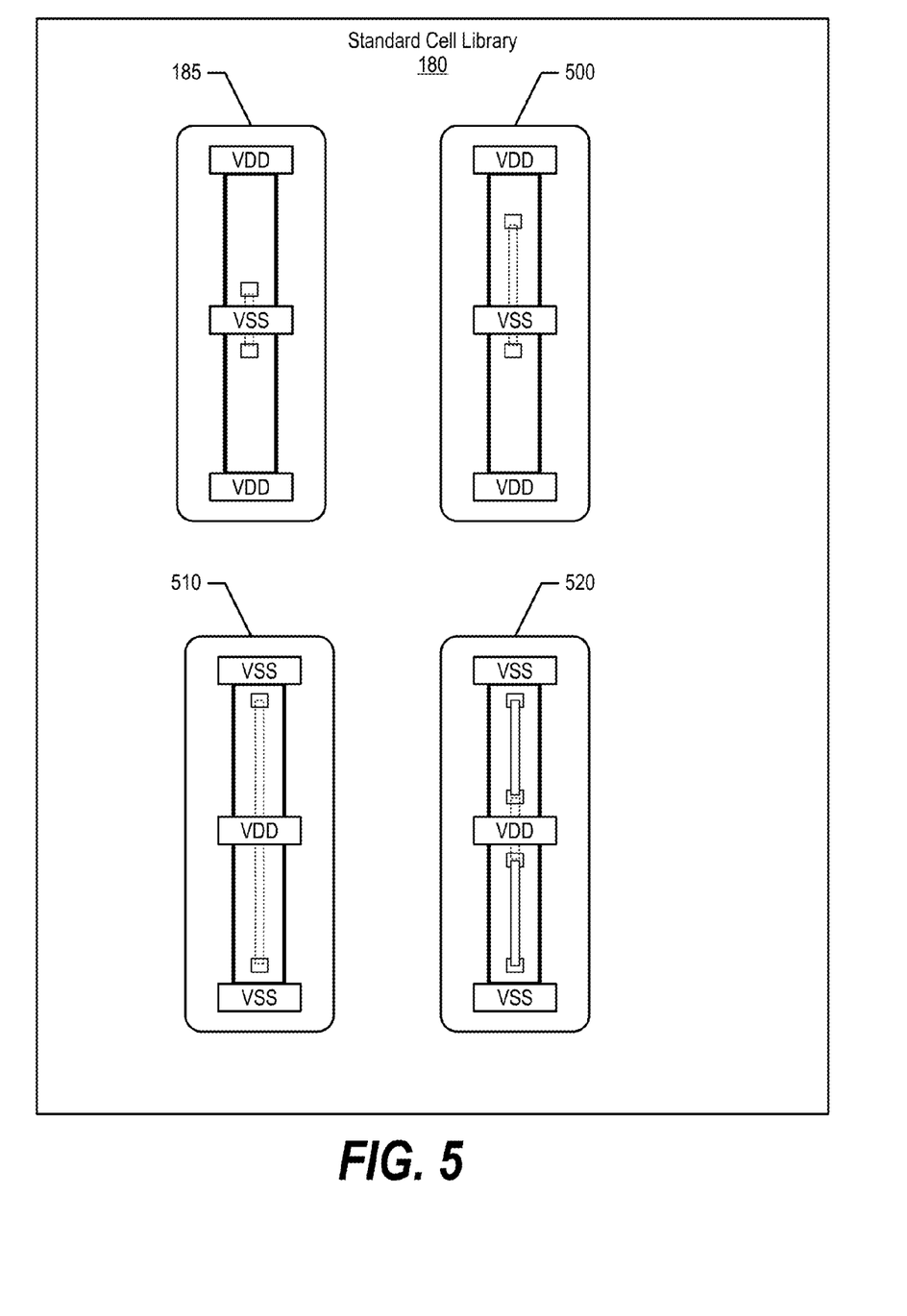
FIG. 5 is a diagram depicting one example of a standard cell library that includes multiple versions of multi-height routing cells.

Multi-height routing cell 185 includes bypass connector 250 and bypass connector 270 to connect to wire object segments (discussed above). Multi-height routing cell 185 also includes power rail segment objects 330, 340, and 350 that provide an electrical connection to the power rails of adjacent cells when multi-height routing cell 185 is placed inline on design floorplan 200 (power rails 210, 215, and 220, see FIG. 2 and corresponding text for further details). As shown in FIG. 5, standard cell library 180 may include multiple versions of a multi-height routing cell, which may include a VSS power rail (e.g., ground) on the edges and a VDD power rail (e.g., positive voltage) in the center.

In one embodiment, multi-height routing cell may utilize more than one routing layer. For example, bypass connector 250 may reside on metal 1 layer and bypass connector 270 may reside on metal 2 layer and traverse through metal 1 layer to couple to bypass connection 260. In another example, bypass connectors 250 and 270 may both reside on metal 2 layer and traverse through metal 1 layer to couple to bypass connection 260.

Figure 4:
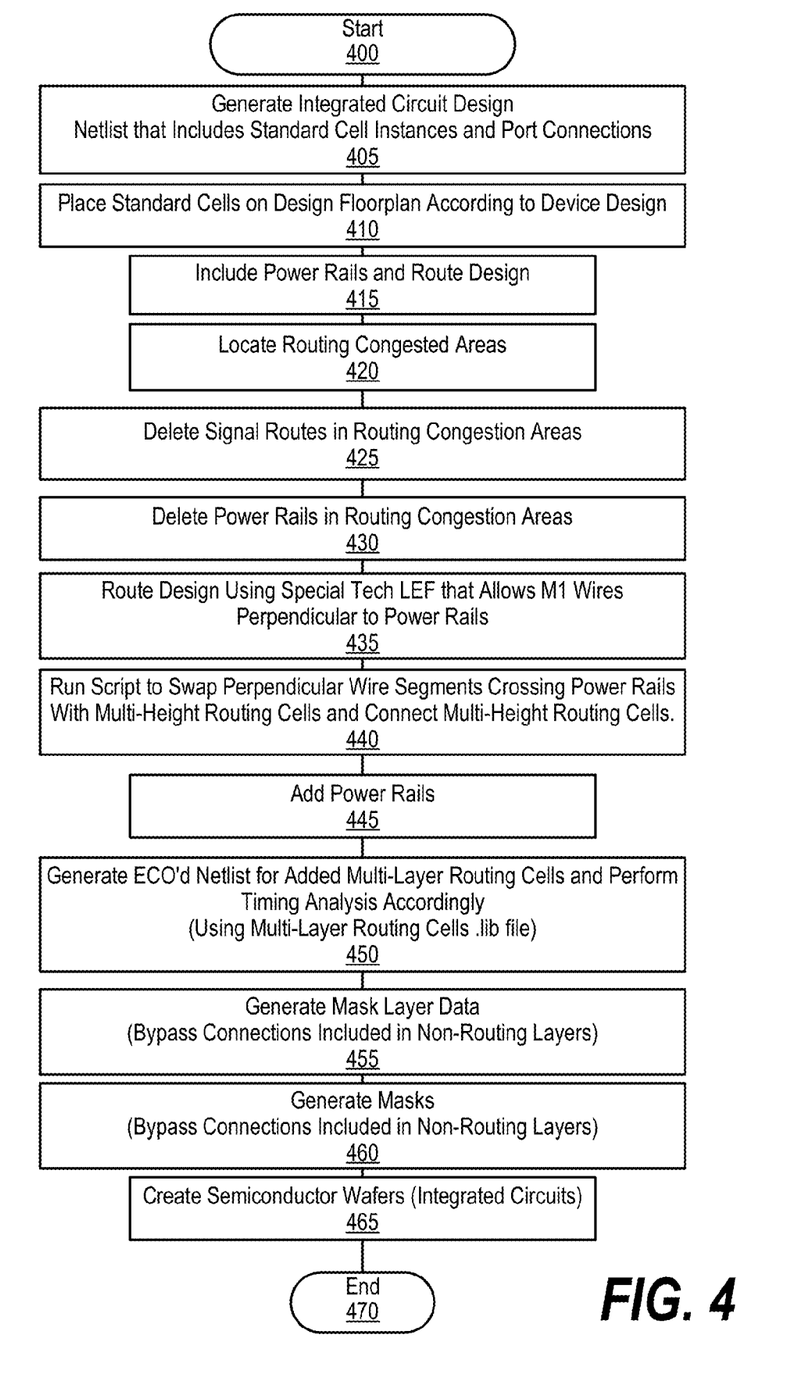
FIG. 4 is a flowchart depicting one example of using multi-height routing cells during integrated circuit floorplanning to reduce routing congestion.

FIG. 4 is a flowchart depicting one example of utilizing multi-height routing cells during integrated circuit floorplanning to reduce routing congestion. Processing commences at 400, whereupon a design tool generates a gate-level netlist that includes standard cell instances and port connections (405). For example, block 405 encompasses steps taken by system modules 110, 120, and 130 shown in FIG. 1.

At 410, the design tool places standard cell instances on design floorplan 200 according to the generated gate-level netlist. At 415, the design tool inserts power rails on routing layers (e.g., metal 1 layer) and routes the design accordingly by placing wire segment objects on design floorplan 200. The design tool locates routing congestion areas ("hot spots") at 420. In one embodiment, the design tool locates hot spots by the density of routing violations using techniques such as physical Design Rule Checks (DRCs) and electrical DRCs. DRCs for routing include shorts from different signals shorted together in a routing layer or spacing violations when signals get too close to other objects (e.g. routes) where manufacturing problems could arise. DRC violations are identified throughout the design and may be displayed to developers as markers on a physical image of the design. A high density of these DRC markers within an area are tagged by the design tool as a "routing congestion area."

In one embodiment, the design tool "clears" the located routing congestion areas on the design floorplan in order to have a clean floorplan from which to start re-routing the design using multi-height routing cells. In this embodiment, the design tool (e.g., congestion reduction sub-system 145) deletes wire segment objects (425) and the power rails (430) in the routing congestion areas. Next, the design tool routes the design based on special temporary LEF (library exchange file) policies, which allows wire segment objects temporarily placed perpendicularly across potential power rail locations (435). Perpendicular metal wire routing is typically not permitted because the wires would cross over a power rail. Perpendicular wire segment object routing is permitted at this point, however, in order to identify areas to replace perpendicular wire segment objects with multi-height routing cells (discussed below).

At 440, the design tool executes a script to replace the temporary wire segment objects that cross locations at which power rails will reside with multi-height routing cells. In one embodiment, each wire segment object is made up of one or more straight line net segments and the design tool recognizes the exact location of these net segments. In this embodiment, the script determines if a net segment would short with a location of a power rail and replaces the net segment with a multi-height routing cell. Once inserted, the design tool connects the multi-height routing cells to other standard cell instances accordingly (e.g., inserts wire objects 235 and 245 shown in FIG. 2). At 445, the design tool adds new power rails back into the design floorplan, which couple to power rail segments included in the multi-height routing cells to form a complete power rail connection.

At 450, the design tool generates a netlist and performs timing analysis based upon the netlist. During the timing analysis, the design tool uses timing values stored in the standard cell library corresponding to the multi-height routing cells. Timing values for signals traversing through a multi-height routing cell may be slightly different than signals traversing through a metal wire segment (see FIG. 6 and corresponding text for further details). Once timing analysis passes, the design tool generates mask layer data (e.g., GDS II formatted) that incorporates the multi-height routing cells (455).

Mask fabrication facility 190, at 460, generates masks from the mask layer data that include a mask for a non-routing layer to create bypass connections. At 465, a semiconductor facility creates semiconductor wafers using the masks and, in one embodiment, a packaging facility packages wafer die from the semiconductor wafer into individual integrated circuit components. Processing ends at 470.

FIG. 5 is a diagram depicting one example of a standard cell library that includes multiple versions of multi-height routing cells. Cells 185 and 500 include VDD (e.g., positive voltage) power rail segments on the edges and a VSS (e.g., ground) power rail segment in the center, whereas cells 510 and 520 included VSS power rail segments on the edges and a VDD power rail segment in the center. Cell 185 includes both bypass connectors close to the center power rail segment and cell 500 includes one bypass connector close to the center power rail segment and another bypass connector further away from the power rail segment.

Congestion reduction sub-system 140, in one embodiment, selects particular multi-height routing cells in standard cell library 180 to include in a design floorplan based upon the power rail segment locations and adjoining standard cell connections for which to connect. For example, FIG. 2 shows that inverter 230's connection and inverter 240's connection are close to power rail 215. As such, congestion reduction sub-system 145 selected multi-height routing cell 185 that includes bypass connectors in similar locations to inverter 230's and 245's connection in order to use "horizontal" wire segment objects to connect the inverter connections to the multi-height routing cell connections.

Cell 510 includes an extended bypass connection in a non-routing layer and cell 520 includes metal routing segments on metal layer 1 and a small bypass connection underneath the middle power rail segment in the non-routing layer. In one embodiment, congestion reduction sub-system 145 selects cell 520 instead of cell 510 for timing purposes because signals typically pass through metal 1 routing faster than through bypass connections. For example, when timing concerns may be of greater importance than routing layer density concerns, cell 520 may be chosen over cell 510 because more of the bypass connector is implemented using a routing layer (e.g. metal 1), which is generally a superior conductor to a non-routing layer. In another example where the local density of routing layer (e.g. metal 1) may be of greater importance than timing concerns, cell 520 (or 185 or 500) may be chosen because more of the bypass connector is implemented using a non-routing layer. In another embodiment, a multi-height routing cell may include a signal buffer coupled to the bypass connection in order to "boost" the signal through the non-routing layer.

Figure 6:
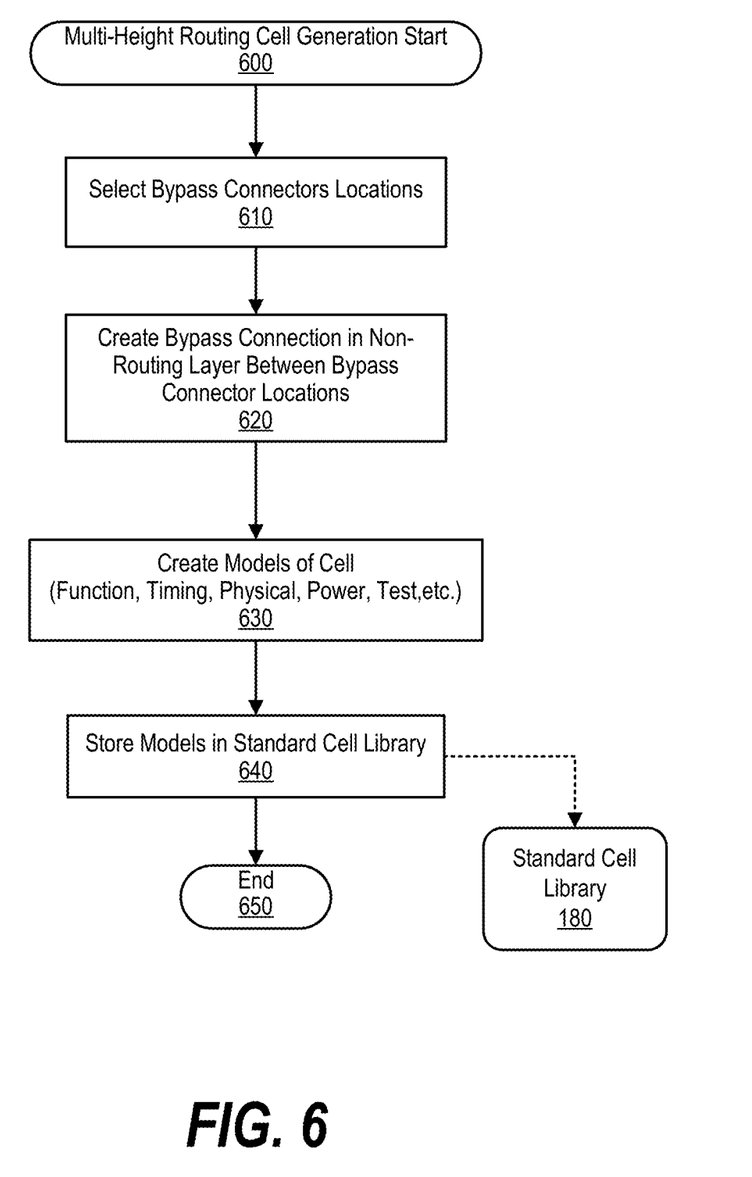
FIG. 6 is a flowchart showing one example of steps taken to create a multi-height routing cell.

FIG. 6 is a flowchart showing one example of steps taken to create a multi-height routing cell. Processing commences at 600, whereupon a model generator (e.g., Tcl script executing inside a library compiler EDA tool) selects "track" locations for bypass connectors (610). In one embodiment, each area between power rails may be segmented into three tracks. For example, bypass connector 250's location may correspond to a "track 1" location and bypass connector 270's location may correspond to a "track 3" location.

At step 620, the model generator creates a bypass connection in a non-routing layer between the bypass connector locations. In one embodiment, the model generator creates a metal segment on a routing layer in order to have a shorter bypass connector (e.g., cell 520 shown in FIG. 5). The model generator, at 630, creates EDA (electronic design automation) models of the multi-height routing cell. The EDA models include functional models, timing models, physical models, power models, test models, and may include other models required by a standard cell design flow. In one embodiment, the timing models are generated by characterizing the bypass connector circuit across process, temperature and process variations using a circuit simulator such as a SPICE simulator. The models are stored in standard cell library 180 at 640 and processing ends at 650.

According to one embodiment of the present disclosure, a design tool system performs a first route of standard cells on a design floorplan corresponding to an integrated circuit design. The first route creates a routing congestion area that has an amount of routing violations exceeding a pre-defined threshold. To reduce the amount of routing violations, the design tool system places a multi-height routing cell on the design floorplan that includes a bypass connection corresponding to a non-routing layer of the integrated circuit, which couples a first bypass connector to a second bypass connector. The design tool system connects the multi-height routing cell to a first standard cell and a second standard cell, which results in the first standard cell coupled to the second standard cell through the multi-height routing cell. In turn, the design tool system generates mask layer data that incorporates the multi-height routing cell and is configured to generate masks for construction of the integrated circuit.

According to another embodiment of the present disclosure, the routing congestion area comprises power rails and signal routes from the first route. In this embodiment, the design tool system removes the power rails and the signal routes from the routing congestion area and performs a second route using routing constraints that allow insertion of a temporary routing segment across a prior location of one of the removed power rails. The design tool system then replaces the temporary routing segment with the multi-height routing cell. In turn, the design tool system adds new power rails to the design floorplan subsequent to the insertion of the multi-height routing cell. In this embodiment, one of the new power rails couples to a power rail segment in the multi-height routing cell and the bypass connection traverses underneath the power rail segment.

According to yet another embodiment of the present disclosure, the first bypass connector and the second bypass connector are in the multi-height routing cell and correspond to a routing layer of the integrated circuit. According to yet another embodiment of the present disclosure, the routing layer corresponds to a metal 1 layer of the integrated circuit and the non-routing layer is a polysilicon layer or a diffusion layer of the integrated circuit.

According to yet another embodiment of the present disclosure, the bypass connection is included in a functional standard cell such as a NAND cell, a NOR cell, a latch cell, an inverter cell, an AND cell, or an OR cell. According to yet another embodiment of the present disclosure, the multi-height routing cell includes a signal buffer coupled to the bypass connection. According to yet another embodiment of the present disclosure, the multi-height routing cell includes more than two metal layers corresponding to the integrated circuit. According to yet another embodiment of the present disclosure, the multi-height routing cell includes a metal routing segment corresponding to the routing layer that couples the bypass connection to the first bypass connector. According to yet another embodiment of the present disclosure, the design tool system inserts the multi-height routing cell during a place and route stage of an automated standard cell design flow.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program, in a non-transitory fashion, for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
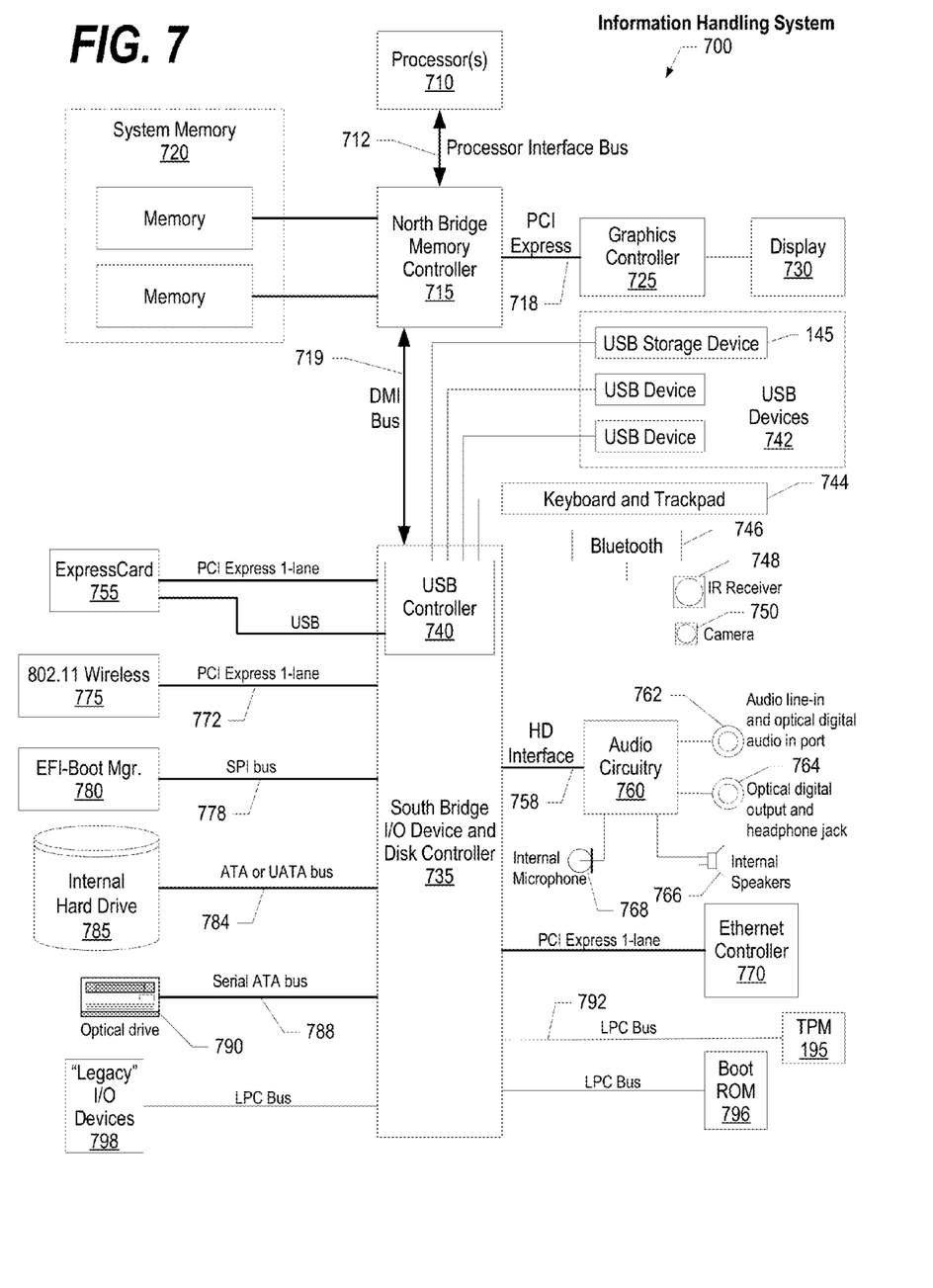
FIG. 7 is a diagram depicting one example if information included in a multi-height routing cell library file.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method of designing an integrated circuit, the method comprising:
   locating a routing congestion area in response to performing a first route of a plurality of standard cells corresponding to the integrated circuit on a design floorplan, wherein the routing congestion area has an amount of routing violations on the design floorplan that exceed a pre-defined threshold;
   inserting a multi-height routing cell on the design floorplan in response to locating the routing congestion area, wherein the multi-height routing cell comprises a bypass connection corresponding to a non-routing layer of the integrated circuit that couples a first bypass connector to a second bypass connector;

connecting the multi-height routing cell to a first one and second one of the plurality of standard cells, the connecting resulting in the first standard cell coupled to the second standard cell through the multi-height routing cell and a reduction in the amount of routing violations; and generating mask layer data that incorporates the multi-height routing cell, wherein the mask layer data is configured to generate a plurality of masks for construction of the integrated circuit.

2. The method of claim 1 wherein the routing congestion area comprises one or more power rails and one or more signal routes from the first route, and wherein the inserting further comprises:

removing the one or more power rails and the one or more signal routes from the routing congestion area;

performing a second route using routing constraints that allow insertion of a temporary routing segment across a prior location of one of the one or more removed power rails; and replacing the temporary routing segment with the multi-height routing cell.

3. The method of claim 2 further comprising:

adding one or more new power rails to the design floorplan subsequent to the insertion of the multi-height routing cell, wherein a selected one of the new power rails couples to a power rail segment in the multi-height routing cell, and wherein the bypass connection traverses underneath the power rail segment.

4. The method of claim 1 wherein the first bypass connector and the second bypass connector are in the multi-height routing cell and correspond to a routing layer of the integrated circuit.

5. The method of claim 4 wherein the routing layer corresponds to a metal 1 layer of the integrated circuit and the non-routing layer is selected from the group consisting of a polysilicon layer and a diffusion layer corresponding to the integrated circuit.

6. The method of claim 1 wherein the bypass connection is in a functional standard cell selected from the group consisting of a NAND cell, a NOR cell, a latch cell, an inverter cell, an AND cell, and an OR cell.

7. The method of claim 1 wherein the multi-height routing cell comprises a signal buffer coupled to the bypass connection.

8. The method of claim 1 wherein the multi-height routing cell comprises more than two metal layers corresponding to the integrated circuit.

9. The method of claim 1 wherein the multi-height routing cell comprises a metal routing segment corresponding to a routing layer that couples the bypass connection to the first bypass connector.

10. The method of claim 1 wherein the multi-height routing cell is inserted during a place and route stage of an automated standard cell design flow.

11. A system comprising:

one or more processors;

a memory accessible by the one or more processors;

a design tool system executed by at least one of the one or more processors and configured to:

locate a routing congestion area in response to performing a first route of a plurality of standard cells corresponding to the integrated circuit on a design floorplan, wherein the routing congestion area has an amount of routing violations on the design floorplan that exceed a pre-defined threshold;

insert a multi-height routing cell in the design floorplan in response to locating the routing congestion area, wherein the multi-height routing cell comprises a bypass connection corresponding to a non-routing layer of the integrated circuit that couples a first bypass connector to a second bypass connector;

connect the multi-height routing cell to a first one and second one of the plurality of standard cells, resulting in the first standard cell coupled to the second standard cell through the multi-height routing cell and a reduction in the amount of routing violations; and generate mask layer data that incorporates the multi-height routing cell, wherein the mask layer data is configured to generate a plurality of masks for construction of the integrated circuit.

12. The system of claim 11 wherein the routing congestion area comprises one or more power rails and one or more signal routes from the first route, and wherein the design tool system, during the insertion of the multi-height routing cell, is further configured to:

remove the one or more power rails and the one or more signal routes from the routing congestion area;

perform a second route using routing constraints that allow insertion of a temporary routing segment across a prior location of one of the one or more removed power rails;

replace the temporary routing segment with the multi-height routing cell; and add one or more new power rails to the design floorplan subsequent to the insertion of the multi-height routing cell, wherein a selected one of the new power rails couples to a power rail segment in the multi-height routing cell, and wherein the bypass connection traverses underneath the power rail segment.

13. The system of claim 11 wherein the first bypass connector and the second bypass connector are in the multi-height routing cell and correspond to a metal 1 routing layer of the integrated circuit and the non-routing layer is selected from the group consisting of a polysilicon layer and a diffusion layer corresponding to the integrated circuit.

14. The system of claim 11 wherein the bypass connection is in a functional standard cell selected from the group consisting of a NAND cell, a NOR cell, a latch cell, an inverter cell, an AND cell, and an OR cell.

15. The system of claim 11 wherein the multi-height routing cell comprises a signal buffer coupled to the bypass connection.

16. The system of claim 11 wherein the multi-height routing cell comprises more than two metal layers corresponding to the integrated circuit.

17. The system of claim 11 wherein the multi-height routing cell comprises a metal routing segment corresponding to a routing layer that couples the bypass connection to the first bypass connector.

18. The system of claim 11 wherein the design tool system inserts the multi-height routing cell during a place and route stage of an automated standard cell design flow.

* * * * *